Figures 1, 2:
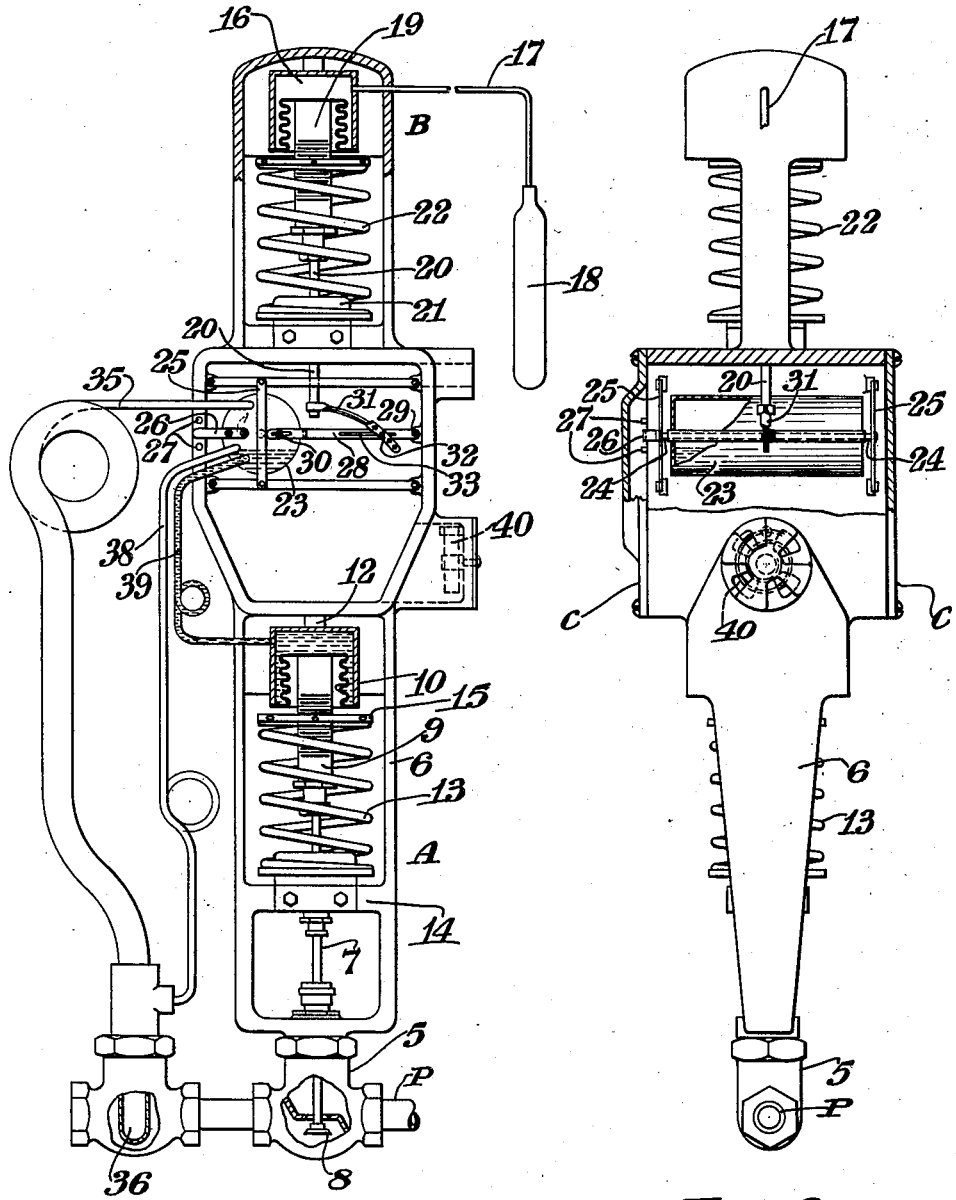

May 27, 1941.　　　W. M. YOUNG　　　2,243,304
SELF-ACTING REGULATOR
Filed Jan. 3, 1938　　　3 Sheets-Sheet 2
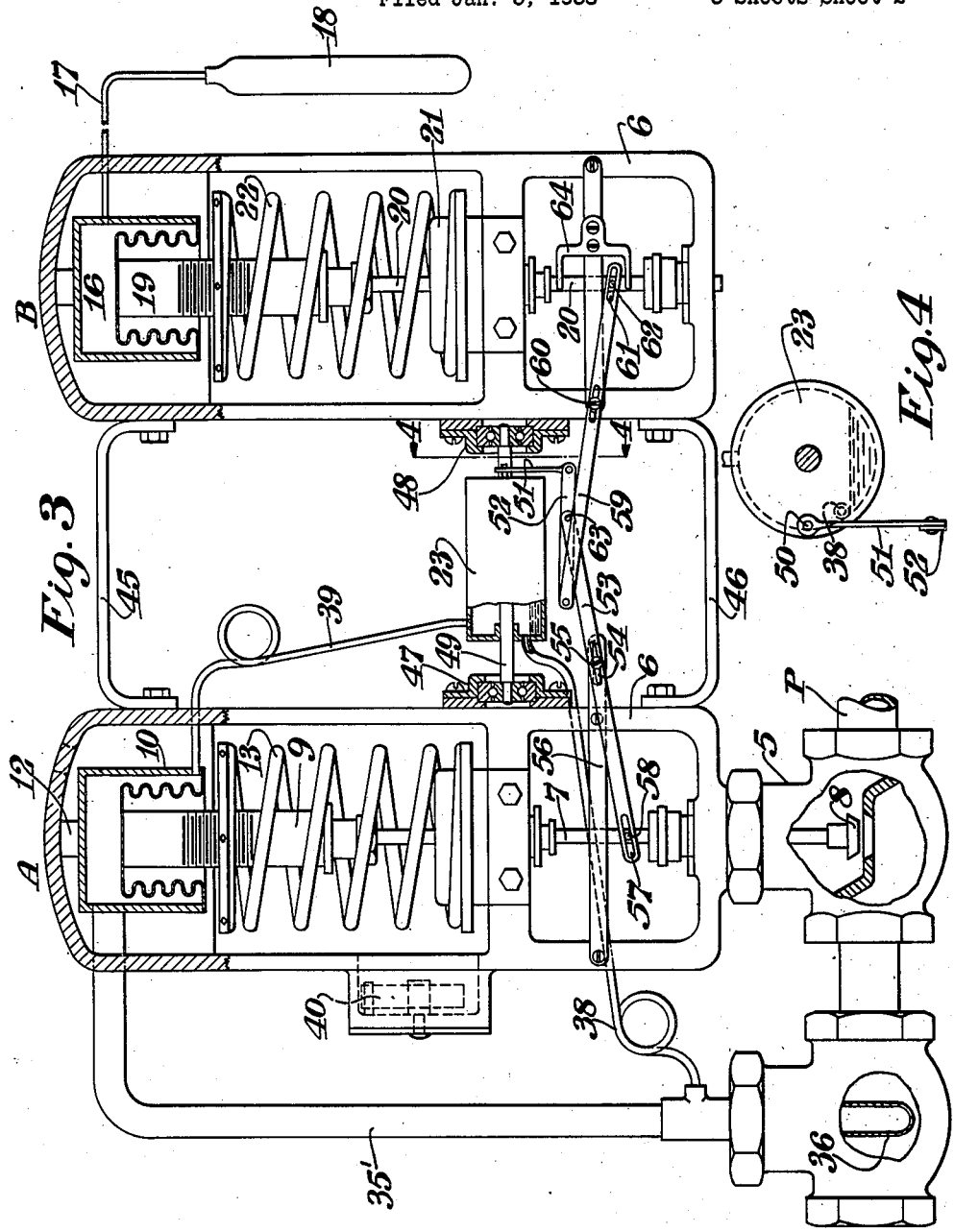
INVENTOR.
WILLIAM M. YOUNG
BY D. Clyde Jones
ATTORNEY.

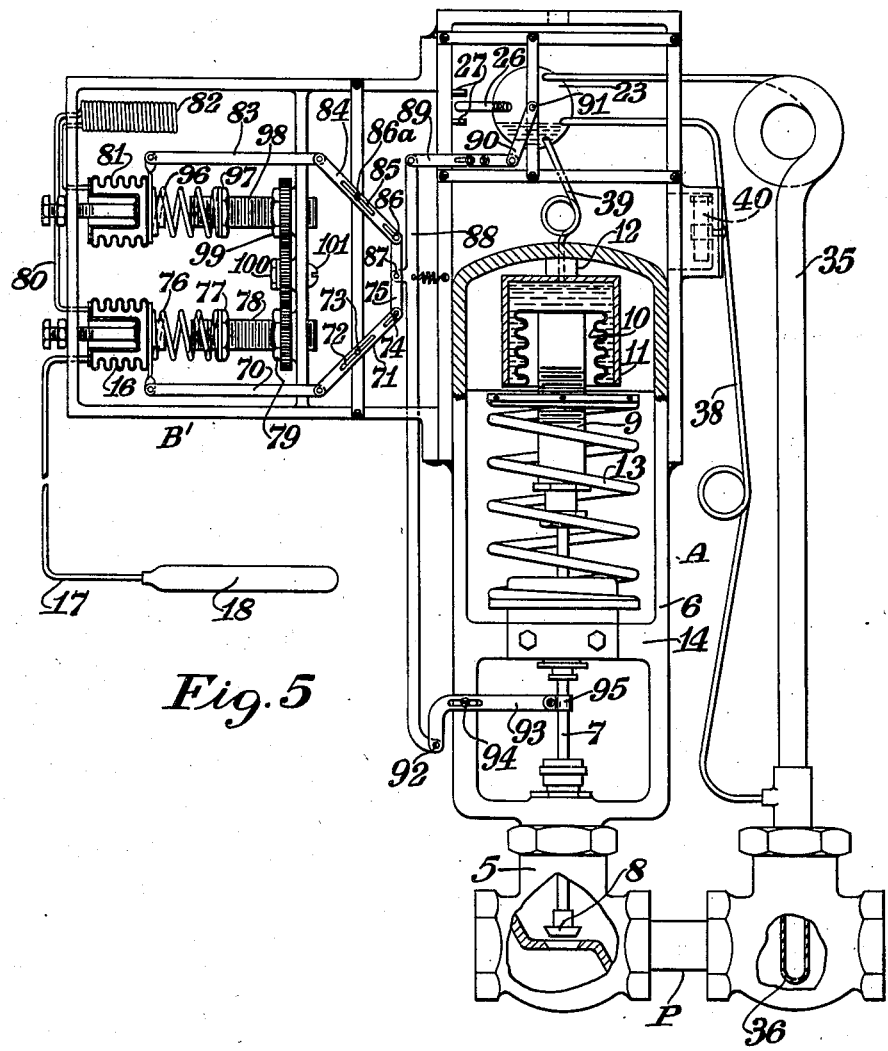

Patented May 27, 1941

2,243,304

UNITED STATES PATENT OFFICE 2,243,304

SELF-ACTING REGULATOR

William M. Young, Athens, Ohio, assignor to Taylor Instrument Companies, Rochester, N. Y., a corporation of New York Application January 3, 1938, Serial No. 183,055

7 Claims. (Cl. 236—68)

This invention relates to regulators and more particularly to regulators of the type which obviate the need of a separate source of controlled pressure fluid for motivating the valve of the regulator.

In applicant's copending application, Serial No. 159,535, which eventuated in Patent No. 2,192,659, March 5, 1940, there is disclosed a type of regulator in which a vaporizable liquid is vaporized in amounts proportional to a deviation in a condition to be regulated, to develop a vapor pressure adequate to actuate a regulating valve or other device which controls the application of a regulating medium for maintaining the desired condition. By this arrangement the need for a separate source of pressure fluid, such as compressed air, is dispensed with. The present invention is directed to a regulator of this same type, but includes a movable reservoir which is tilted to positions corresponding to condition changes so that proportional amounts of vaporizable liquid therein are discharged into a boiler or the like to develop a vapor pressure so that a regulating valve in the control medium line is moved to a position corresponding to the condition change.

The various features and advantages of the invention will appear from the detailed description and claims when taken with the drawings in which Fig. 1 is a front elevation with parts thereof broken away; Fig. 2 is a side elevation with certain parts in section of the regulating device of the present invention; Fig. 3 is a front elevation partially in section of the modified form of the regulator of this invention; Fig. 4 is a section of this modified regulator taken on the line 4—4 of Fig. 3; and Fig. 5 is a front elevation partially in section of a further modified form of this invention.

Referring to Fig. 1 there is illustrated a valve body 5 connected in a pipe P through which a regulating medium, such as steam, flows to maintain the desired condition. The valve body has mounted thereon a frame 6 having suitable guides (not shown) in which a valve stem 7, provided with a valve disc 8, is adapted for lengthwise motion. The valve stem 7 at the upper end thereof, as illustrated, is provided with a valve stem extension 9 to which there is secured a pressure-responsive element 10, including a metal bellows. The edge of this bellows is connected by a liquid-tight joint to the rim of a cup which has its closed end rigidly connected at 12 to the frame 6. A coil spring 13 which encloses the valve stem and its extension has one end engaging an adjustable member carried on the cross bar 14 of the frame and has its other end engaging a disc or washer 15 attached to the valve stem extension. The portion of the regulator first described is designated unit A for convenience in description.

The regulator also includes a second unit designated B. This unit is provided with condition-sensing means, such as a tube system, comprising a pressure-responsive element 16, which may be in the form of a metal bellows, as well as a capillary tube 17 communicating therewith and with a bulb 18 to be subjected to the temperature or other condition that is to be maintained at a desired value. This tube system may be filled with a liquid or with a liquid and its vapor. The bellows 16 is supported on a U-shaped bracket mounted on the top of the frame 6 and has connected thereto a rod 19 provided with an extension rod 20 passing through and movably mounted in a guide 21 secured on the frame. A coil spring 22 encloses a portion of the rod 19 and the extension 20 normally to oppose the pressure developed in the bellows 16 and thus maintain the rod 20 in its upper position except when the element 16 expands. In the upper portion of the frame 6 there is mounted a cylindrical reservoir 23 pivoted at 24 on suitable brackets 25 so that it is adapted to rotate about its long axis. An arm 26 rigidly connected to one end of the reservoir is mounted to engage stops 27 provided on the frame so that the rotation of the reservoir in either direction is limited to a definite predetermined arc. A link 28 pivotally connected at 29 on the frame and eccentrically pivoted at 30 on the end of the reservoir, is adapted to rock the reservoir in a direction determined by the direction of movement of the rod 20. Rod 20 effects this action since it is provided at its lower end with an arm 31 having an adjustable pivot 32 therein which travels in the slot 33 in the link. It will be understood that the arm 31 is preferably made of bimetallic material to compensate for temperature changes occurring in the region of the reservoir. The upper portion of the reservoir is connected by a relatively large vapor tube 35, with a boiler 36 which preferably projects into and is heated by the regulating medium, such as live steam, passing through the pipe P. The reservoir at an intermediate point therein communicates through the conduit 38 with the boiler. At a lower point in the reservoir than either of these other connections, there is a connection therefrom through conduit 39 with the bellows 10. It will be understood that conduits 35, 38 and 39 will preferably be made of flexible material or if the material of the conduits is somewhat rigid, then they will be provided with coils therein to permit the reservoir to rotate without being substantially retarded by its conduit connections. It should be mentioned that the reservoir is completely enclosed by a portion of the frame and the covers C so that it will not be influenced by changes in the temperature of the surrounding air. If desired, the mentioned enclosure may be provided with an opening closed by adjustable shutters 40 which may be thermostatically controlled to render the temperature within the enclosure substantially uniform.

In the operation of the device, let it be assumed that an increase in temperature takes place at the bulb 18, the filling medium in the tube system including the bulb expands so that the bellows 16 moves downward. As the bellows moves downward, the rod 19 and the extension rod 20 are forced downward against the action of the spring 22. This downward motion causes the arm 31 to swing the link 28 in a counterclockwise direction so that the reservoir 23 is rotated in a clockwise direction. This rotation of the reservoir causes the level of the liquid therein to be positioned below the entrance of the conduit 38 and thus no liquid is discharged from the reservoir into the boiler. However, the vapor in the conduit 35 condenses so that the pressure in the system and liquid pressure in the bellows 10 is reduced, with the result that the spring 13 elevates the valve stem to close the valve. When, however, the temperature at the bulb 18 decreases, the thermosensitive fluid therein contracts which causes the element 16 to contract and elevate the push rod 20. This rod, through the arm 31 and link 28, rocks the reservoir counterclockwise as illustrated in Fig. 1. As the reservoir is thus rotated, the level of the liquid therein is raised above the inlet to the conduit 38 so that a certain amount of the liquid is discharged into the boiler 36. The liquid thus discharged in the boiler vaporizes quickly and the increased vapor pressure in the conduit 35 and in the top of the reservoir 23, forces some of the liquid in the reservoir through the conduit 39 and into the element 10. This element is thus forced to expand and depresses the valve stem 7 to open the valve port, thereby permitting more of the heating medium to pass through the pipe P.

In Fig. 3 there is illustrated a modified form of the invention wherein the bellows 10 is actuated by vapor pressure instead of by liquid pressure as in the arrangement of Fig. 1. In this modified arrangement also the parts are so interrelated as to ensure that the valve stem will take a position indicated by the temperature sensing unit and a precise positioning of the valve stem will be effected irrespective of all ordinary friction encountered in service. This modified arrangement, as in the case of the arrangement of Fig. 1, comprises two units A and B having corresponding parts identified by the same reference characters. In this instance, however, the unit B, instead of being mounted on the top of unit A, is mounted at the side thereof but in spaced relation, the mounting being effected by the spacing brackets 45 and 46. The adjacent sides of the units A and B provide a mounting for the ball bearing supports 47 and 48 in which the ends of the shaft 49 carrying a rotatable reservoir 23, are supported. On the right-hand end of the reservoir as viewed in Fig. 4, there is provided an eccentrically mounted pin 50 to which one end of the link 51 is connected. The other end of this link is connected to the right-hand end of the lever 52 which is pivoted at its intermediate point on the right-hand end of the lever 53. At an intermediate portion of this lever 53, there is provided a slot 54 which receives a screw 55 adjustably mounted in a slot on a fixed arm 56 projecting from the right-hand side of the frame 6. The left-hand end of the lever 53 is provided with a slot 57 to receive a pin 58 projecting from the valve stem 7. The left-hand end of the lever 52 is pivotally connected to a third lever 59 provided at an intermediate point with a slot to receive the fulcrum screw 60 mounted on the frame 6. The right-hand end of the lever 59 is provided with a slot 61 to receive a pin 62 carried on the push rod 20 of the unit B. The frame of the unit B is provided with a fixed U-shaped bracket 64, the projecting ends of which serve as stops to limit the upward and downward movement of the right-hand end of lever 59.

In the operation of this modified regulator, if there is an increase in temperature at the bulb 18, the thermo-sensitive fluid therein expands. This causes the element 16 to expand which forces the extension 19 and its push rod 20 downward. The pin 62 on the push rod, since it moves in the slot 61 of the lever 59, swings this lever in a clockwise direction. Thus the left-hand end of the lever 59 is moved upward and since the lever 53 is stationary at this time, lever 52 will be swung clockwise about its pivot 63. Thus the link 51 will be moved downward to rock the reservoir 23 in a counterclockwise direction (Fig. 4). The inlet to the conduit 38 will be brought below the level of the liquid in the reservoir so that some of the liquid in the reservoir will be discharged through this conduit into the boiler 36. When this discharged liquid reaches the boiler, it is immediately vaporized and the increased vapor pressure expands the element 10 which lowers the valve disc to reduce the flow of heating medium through the pipe P. When the valve stem 7 is thus lowered, the left end of the lever 53 will be lowered causing its right-hand end and the pivot 63 to be elevated. The raising of the pivot 63 elevates the right-hand end of lever 52 and link 51 connected to the reservoir. This causes the reservoir to be rotated in a clockwise direction so that the inlet to the conduit 38 is elevated above the level of the liquid in the reservoir. The vapor in the conduit 35' will condense and the pressure in the bellows 10 will decrease a small amount, permitting the valve disc 8 to rise slightly. It will thus be seen that the valve stem 7 is interconnected through the lever 53 with the lever 59 which rocks the reservoir on a temperature change. By this arrangement there is an interconnection between the units A and B so that the unit A will always be operated to position the valve disc at the precise point required by the temperature prevailing at the bulb 18.

On a temperature decrease at bulb 18, the units B and A operate in the same manner as just described but in the opposite sense to elevate the valve disc 8 to permit an increased flow of the heating medium through the pipe P.

The modified arrangement of the invention shown in Fig. 5 is provided with a reset arrangement to compensate for load changes and the like. In this modified arrangement, the unit A and the reservoir 23 are similar to corresponding parts in Fig. 1 and are identified by the same reference characters. The unit B' of this arrangement is somewhat analogous to the unit B in the arrangement of Fig. 1. However, in this unit the element 16 has its movable end connected by a link 70 to one end of a lever 71 which is provided at its intermediate point with a slot 72 adapted to receive a fixed pivot pin 73 on the frame of the unit B'. The other end of the lever 71 is provided with a slot in which a pivot pin 74 on the lower end of the lever 75 is adapted to slide. The free end of the element 16 is engaged by a spiral spring 76 which engages a nut 77 in threaded engagement with a bolt 78 adjustably carried in the nut 79 on the frame. The element 16 communicates through a capillary tube 80 with a bellows 81 which has its left end rigidly mounted on the frame. It will be noted that the capillary tube has a coil 82 formed to delay the transfer of the actuating medium between the bellows 16 and bellows 81. It will be understood that the coil 82 may be of various lengths to determine the amount of delay in the transfer of the liquid between the respective bellows. The free end of the bellows 81 is opposed by a spiral spring 96 which engages a nut 97 in threaded engagement with bolt 98. This bolt is carried by a nut 99 adjustably mounted on the frame. The nuts 79 and 99 have gear teeth formed therein which are engaged by the teeth on an intermediate gear 100. The stem of this gear is provided with a kerf 101 to receive a screw driver. The gear 100 may thus be rotated to simultaneously rotate nuts 79 and 99 and thereby moves the bolts 78 and 98 lengthwise to vary the tension of the springs 76 and 96. The free end of the bellows 81 is connected by a link 83 to the upper end of a lever 84 which is provided at its intermediate point with a slot 85 to receive the pivot pin 86ª mounted on the frame. The lower end of the lever 84 is provided with a slot to receive a pin 86 on the upper end of the lever 75 which is pivoted at 87 on an extension located at an intermediate point on the lever 88. This lever 88 at its upper end is connected by a link 89 to the free end of a crank arm 90 affixed to the shaft 91 on which rotates the reservoir 23. The lower end of the lever 88 is pivoted at 92 to the left end of a bell crank lever 93, in turn, pivoted at 94 on the frame 6. The right-hand end of lever 93 is pivotally connected by means of a clamping sleeve 95 to the valve stem 7.

In the operation of this modified form of the invention, let it be assumed that the temperature at the bulb 18 increases, which results in the expansion of the thermosensitive medium in bulb 18, capillary tube 17 and the bellows 16. This immediately causes the bellows 16 to expand and through the action of the link 70, swings the lever 71 in a counterclockwise direction. Since the pivot 86 at the upper end of the lever 75 is held stationary at this time, the movement of lever 71 swings the lever 75 in a clockwise direction. This results in swinging the lever 88 connected thereto so that its upper end moves toward the left of Fig. 5. The mentioned movement of the lever 88 is communicated through the link 89 to the crank arm 90 causing the reservoir to rotate in a clockwise direction. When the reservoir 23 is thus rotated, the level of the liquid therein is brought above the entrance to the conduit 38 so that a certain amount of liquid in the reservoir is discharged through this conduit to the boiler 36. The liquid discharged into the boiler vaporizes and the increased pressure in conduit 35 and in the upper part of the reservoir 23 forces a certain amount of the liquid in the reservoir into the element 10. This expands the element 10 and thus lowers the extension rod 9 and the valve stem 7 to lower the valve disc 8. This cuts off some of the flow of the heating medium. As the valve stem is thus lowered, the bell crank lever 93 connected thereto, forces the lever 88 to swing in a clockwise direction. Link 89 connected to the upper end of the lever 88 rotates the reservoir 23 in a counterclockwise direction to decrease the discharge of the liquid through conduit 38 into boiler 36. Some of the vapor in conduit 35 condenses thereby permitting a slight opening of the valve disc 8. Since there is an interconnection between the valve stem 7 and the reservoir 23, the valve disc 8 will always be precisely positioned even though a large amount of valve stem friction is present.

It will be recalled that the bellows 16 is connected to the bellows 81 by means of the conduit 80. Thus when the filling medium in the bulb 18, capillary 17 and bellows 16 expands in response to temperature increase at the bulb 18, a certain amount of the liquid in the bellows 16 passes through the capillary tube and resistance coil 82 into the bellows 81. Eventually bellows 81 will also expand, the time of its operation being determined by the length of the capillary tube 80 and the resistance coil 82. When the bellows 81 expands, it forces link 83 toward the right. This link swings the lever 84 in a clockwise direction and since lever 84 is connected to the upper end of lever 75, this lever is rotated in a counterclockwise direction. The lever 75 since it is connected to the lever 88, swings this lever in a counterclockwise direction to operate the link 89 and crank 90 so that reservoir 23 is rotated in a clockwise direction. This rotation of the reservoir discharges a certain amount of liquid through the conduit 38 into the boiler 36. This discharged liquid in the boiler vaporizes and the increased vapor pressure in conduit 35 and in the reservoir 23 forces an additional amount of liquid through conduit 39 into the bellows 10. This causes element 10 to expand and to effect a further closing of the valve disc. In the modified arrangement just described, it will be noted there is an initial prompt response in one direction followed by a delayed response in the same direction which resets the regulator to compensate for load changes and the like.

I claim:

1. In a regulating device, an adjustable member for governing the application of a regulating medium to maintain a predetermined condition, means including a closed fluid pressure system having therein a vaporizable liquid and its vapor for operating said member, said system including a boiler and a bodily movable reservoir discharging into said boiler, mechanism responsive to a deviation in said condition for moving said reservoir to discharge the liquid therefrom or to retain the liquid therein and thereby vary the relative amounts of said liquid and said vapor as a function of said deviation whereby said member is moved, and means controlled in response to each movement of said member for further varying the relative amounts of said liquid and said vapor whereby a further movement of said member in the opposite sense is effected.

2. In a regulating device, an adjustable member for governing the application of a regulating medium to maintain a predetermined condition, means including a closed fluid pressure system having therein a vaporizable liquid and its vapor for operating said member, said system including a boiler and a tiltable reservoir discharging into said boiler and having a vapor passage from said boiler to said reservoir, mechanism responsive to a deviation in said condition for tilting said reservoir to discharge liquid therefrom or to retain liquid therein and thereby vary the relative amounts of said liquid and said vapor as a function of said deviation whereby said member is moved, and means controlled in response to each movement of said member for further tilting said reservoir in the original direction to vary the relative amounts of said liquid and said vapor whereby a further movement of said member is effected in the opposite sense.

3. In a regulating device, a condition-responsive system, two pressure responsive units operable by a pressure change corresponding to a change in a condition to be regulated, the response of one of said units being prompter than that of the other, an adjustable member for governing the application of a regulating medium to maintain said condition at a predetermined value, means including a closed fluid pressure system having therein a vaporizable liquid and its vapor for operating said member, said system including a boiler and a tiltable reservoir discharging into said boiler, and means actuated jointly by said units for tilting said reservoir to discharge liquid therefrom or to retain the liquid therein and thereby vary the relative amounts of said liquid and said vapor as a function of said deviation whereby said member is moved.

4. In a regulating device, a condition-responsive system, two pressure responsive units operable by a pressure change corresponding to a change in a condition to be regulated, the response of one of said units being prompter than that of the other, an adjustable member for governing the application of a regulating medium to maintain said condition at a predetermined value, means including a closed fluid pressure system having therein a vaporizable liquid and its vapor for operating said member, said system including a boiler and a tiltable reservoir discharging into said boiler, means actuated jointly by said units for tilting said reservoir to discharge liquid therefrom or to retain the liquid therein and thereby vary the relative amounts of said liquid and said vapor as a function of said deviation whereby said member is moved, and means controlled by each movement of said member for further tilting said reservoir whereby a further movement of said member in the opposite sense is effected.

5. In a regulating device, an adjustable member for governing the application of a regulating medium to maintain a predetermined condition, means including a closed fluid pressure system having therein a vaporizable liquid and its vapor for operating said member, said system including a boiler and a reservoir discharging into said boiler, said reservoir normally being filled with said liquid and its vapor, mechanism responsive to a deviation in said condition for discharging liquid from or for retaining liquid in said reservoir and thereby varying in an original sense the relative amounts of said liquid and said vapor as a function of said deviation whereby said member is moved accordingly, means controlled in response to each movement of said member for operating said mechanism to further vary in the opposite sense the relative amounts of said liquid and said vapor, and slow acting means also responsive to said deviation for operating said mechanism to vary in the original sense the relative amounts of said liquid and said vapor.

6. In a regulating device, a condition-responsive system, two pressure responsive units operable by a pressure change corresponding to a change in a condition to be regulated, the response of one of said units being prompter than that of the other, an adjustable member for governing the application of a regulating medium to maintain said condition at a predetermined value, means including a closed fluid-pressure system having therein a vaporizable liquid and its vapor for operating said member, said system including a boiler and a movable reservoir discharging into said boiler, said reservoir normally being filled with said liquid and its vapor, mechanism actuated jointly by said units for moving said reservoir to discharge said liquid from or to retain said liquid in said reservoir and thereby vary the relative amounts of said liquid and said vapor as a function of said deviation whereby said member is moved.

7. In a regulating device, a condition-responsive system, two pressure responsive units operable by a pressure change corresponding to a change in a condition to be regulated, the response of one of said units being prompter than that of the other, an adjustable member for governing the application of a regulating medium to maintain said condition at a predetermined value, means including a closed fluid pressure system having therein a vaporizable liquid and its vapor for operating said member, said system including a boiler and a reservoir discharging into said boiler, said reservoir normally being filled with said liquid and its vapor, mechanism actuated jointly by said units for causing liquid to be discharged from or to be retained in said reservoir and thereby varying the relative amounts of said liquid and said vapor as a function of said deviation whereby said member is moved, and means controlled by each movement of said member for operating said mechanism whereby additional movement of said member in the opposite sense is effected.

WILLIAM M. YOUNG.